(12) United States Patent
Melo et al.

(10) Patent No.: US 12,495,030 B2
(45) Date of Patent: Dec. 9, 2025

(54) TECHNOLOGIES FOR ATTESTATION INDICATIONS IN COLLABORATION SERVICES

(71) Applicant: Beyond Identity Inc., New York, NY (US)

(72) Inventors: Nelson Melo, New York, NY (US); C. Jasson Casey, Verbank, NY (US); Crispin Cowan, Fall City, WA (US); Husnain Bajwa, Austin, TX (US); Allan Ziolkowski, Ottawa (CA); Harry Guo, New York, NY (US); Ariana Ray, Des Plaines, IL (US)

(73) Assignee: Beyond Identity Inc., New York, NY (US)

( * ) Notice: Subject to any disclaimer, the term of this patent is extended or adjusted under 35 U.S.C. 154(b) by 87 days.

(21) Appl. No.: 18/617,438

(22) Filed: Mar. 26, 2024

(65) Prior Publication Data

US 2025/0286877 A1 Sep. 11, 2025

Related U.S. Application Data

(60) Provisional application No. 63/563,272, filed on Mar. 8, 2024.

(51) Int. Cl.
*G06F 7/04* (2006.01)
*H04L 9/40* (2022.01)

(52) U.S. Cl.
CPC ............................ *H04L 63/0815* (2013.01)

(58) Field of Classification Search
CPC ........ G06F 21/31; G06F 21/335; G06F 21/60; H04L 9/32; H04L 63/0876; H04L 63/10; H04L 63/0815
See application file for complete search history.

(56) References Cited

U.S. PATENT DOCUMENTS

| | | | |
|---|---|---|---|
| 11,119,985 B1* | 9/2021 | Alagianambi | G06F 9/541 |
| 11,336,516 B1* | 5/2022 | Birgiolas | H04L 63/0272 |
| 11,503,056 B1* | 11/2022 | Celiesius | H04L 63/1425 |
| 2002/0073151 A1* | 6/2002 | Rogers | G06Q 10/10 |
| | | | 709/204 |
| 2010/0049683 A1* | 2/2010 | Carter | G06Q 10/10 |
| | | | 706/46 |
| 2016/0119315 A1* | 4/2016 | Uzelac | H04L 65/4038 |
| | | | 709/204 |
| 2016/0366708 A1* | 12/2016 | Yeom | H04W 4/80 |
| 2017/0193448 A1* | 7/2017 | Piyush | H04L 67/1044 |
| 2018/0123898 A1* | 5/2018 | Yakuwa | H04L 41/40 |
| 2019/0108239 A1* | 4/2019 | Yang | G06Q 10/107 |

OTHER PUBLICATIONS

Madani et al, Access Control for Collaboration in Cloud Environment: A Comparative Analysis, IEEE, Oct. 28, 2023, pp. 1-7. (Year: 2023).*

(Continued)

*Primary Examiner* — Philip J Chea
*Assistant Examiner* — Jenise E Jackson
(74) *Attorney, Agent, or Firm* — Greenberg Traurig, LLP

(57) ABSTRACT

The present application relates to devices and components including apparatus, systems, and methods for presenting attestation indications in collaboration services.

17 Claims, 11 Drawing Sheets

(56) References Cited

OTHER PUBLICATIONS

Liscano et al, Discovering and Managing Access to Private Services in Collaborative Sessions, IEEE, Oct. 23, 2006, pp. 1086-1097. (Year: 2006).*

Grassi, et al., "Digital Identity Guidelines," NIST Special Publication 800-63-3, Oct. 16, 2023, 52 pages.

Lodderstedt, et al., "OpenID Connect for Identity Assurance," Mar. 13, 2019, 15 pages.

* cited by examiner

| | External users | Internal users |
|---|---|---|
| High authentication strength | Not visible | Visible |
| Low authentication strength | Visible | Visible |

```
┌─────────────────────────────────────────────────────┐
│   Creating, with a device system, a CS attestation  │
│                         904                         │
└─────────────────────────────────────────────────────┘
                            │
                            ▼
┌─────────────────────────────────────────────────────┐
│ Measuring first SSB transmitted by source NP and second SSB │
│   transmitted by target NP based on the one or more SMTCs   │
│                         908                         │
└─────────────────────────────────────────────────────┘
```

FIG. 9

TECHNOLOGIES FOR ATTESTATION INDICATIONS IN COLLABORATION SERVICES

RELATED APPLICATION

This application claims priority to U.S. Provisional Application No. 63/563,272, filed Mar. 8, 2024, and hereby incorporates said application by reference in its entirety.

FIELD

This application relates to the field of network communications and, in particular, to technologies for attestation indications in collaboration services.

BACKGROUND

Strong authentication and single sign-on (SSO) technologies provide both enhanced security and user convenience for enterprises. However, even when companies put in place security controls like SSOs, two problems exist. First, attackers with weak or stolen credentials can still access enterprise collaboration platforms, such as audio and video calls or others, and use deepfakes to persuade other users of their authenticity. Second, even when deepfakes are not used, existing content sharing platforms lack effective mechanisms for participants to provide verifiable attestations.

BRIEF DESCRIPTION OF THE DRAWINGS

FIG. 6 is a chart depicting a selective display of indications in accordance with some embodiments.

FIG. 9 illustrates another operation flow/algorithmic structure in accordance with some embodiments.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail.

For the purposes of the present document, the phrases "A/B" and "A or B" mean (A), (B), or (A and B); the phrase "(A) B" means (B) or (A and B), that is, A is optional; and the phrase "based on A" means "based at least in part on A," for example, it could be "based solely on A" or it could be "based in part on A."

As briefly introduced above, some environments may allow participation in collaborative platforms with little to no authentication. In these environments, intrusion into an enterprise may be relatively easy to accomplish, and users who are only weakly authenticated may still be visible to others. Applications may not recognize that some users are less authenticated than others. This may be of special concern in communication applications where a deepfake, which may be enabled by convincing audio or video impersonation, can falsely enhance other users' belief in the authenticity of the intruder. Developments in artificial intelligence, machine learning, large language model (LLMs), and stable diffusion have lead to a dramatic increase in the threat to enterprise platforms provided by deepfake attacks.

Embodiments of the present disclosure provide security systems to mitigate these and other threats. For example, some embodiments describe integrating strong authentication with collaborative service platforms. This may be done by providing unforgeable attestations, which may be signed by keys rooted in a hardware root of trust, to a content owner or meeting host and, optionally, to participants of a collaborative service. This may allow the recipients of the attestations to understand and make decisions about a participant's involvement within the collaborative service environment.

Figure 1:
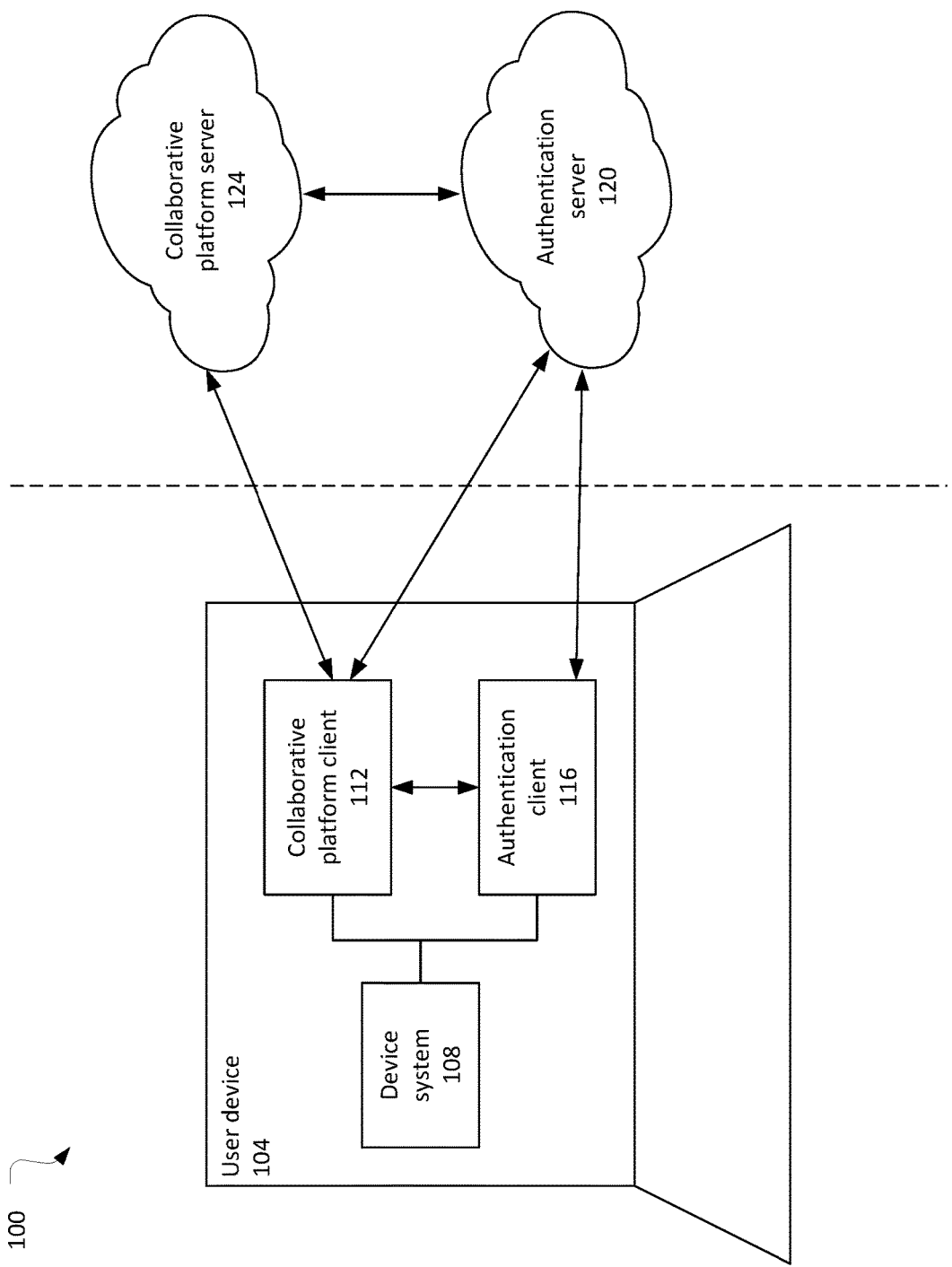
FIG. 1 illustrates network environment in accordance with some embodiments.

FIG. 1 illustrates a network environment 100 in accordance with some embodiments. The network environment 100 may include a user device 104 that provides a device system 108, collaborative platform client 112, and an authentication client 116 communicatively coupled with one another via local connections as shown. The device system 108 may represent a collection of hardware/software systems on the user device 104 to provide various functionality, some of which will be described in further detail herein.

The authentication client 116 may be communicatively coupled with an authentication server 120 over a network connection. The collaborative platform client 112 may be communicatively coupled with a collaborative platform server 124 over a network connection. In some embodiments, the collaborative platform client 112 may additionally be communicatively coupled with the authentication server 120. However, in some embodiments, device communication with the authentication server 120 may be handled exclusively by the authentication client 116.

The collaborative platform server 124 and collaborative platform client 112 may cooperate to provide collaborative services to the user device. Reference to "collaborative platform" may refer to either or both of the collaborative platform server 124 and the collaborative platform client 112. The collaborative services may include, but are not limited to, (video/web/tele) conference services, document collaboration services, cloud-based team communication platform services, immersive virtual/augmented reality (AR) services, etc. The collaborative platform server 124 may include an application programming interface (API) or other interface technology to communicatively couple with the authentication server 120.

The authentication server 120 and the authentication client 116 may cooperate to provide authenticated attestations for the purposes of participating in collaborative services provided by the collaborative platform. The authentication server 120 may be a single sign-on (SSO) or other type of authentication server that provides centralized authentication processes. The authentication server 120 and authentication client 116 may cooperate to obtain attestations from participants of a collaborative service and provide the attestations, or indication thereof, to the collaborative platform.

Figure 2:
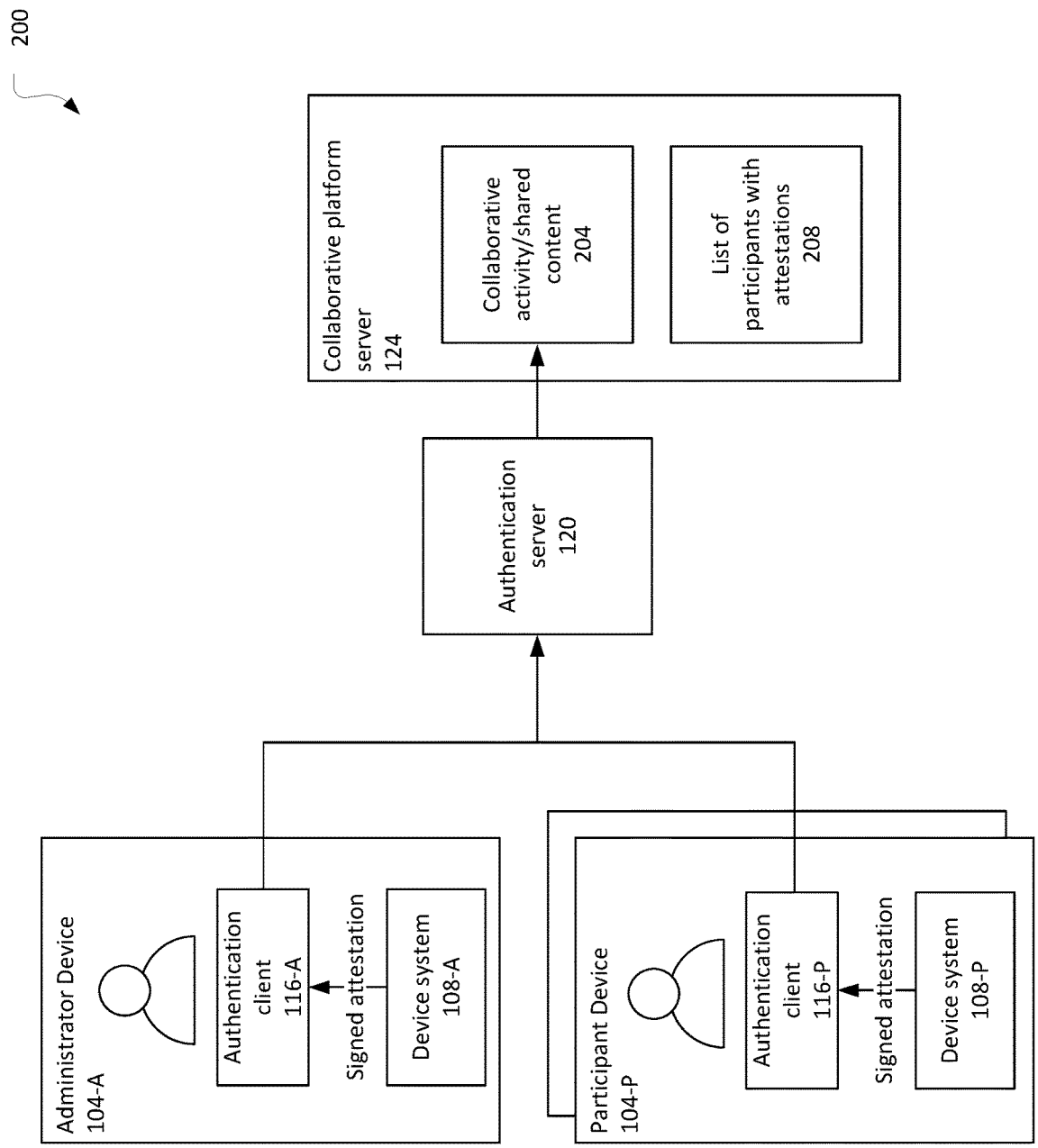
FIG. 2 illustrates the network environment in accordance with some additional embodiments.

FIG. 2 illustrates the network environment 100 in accordance with some embodiments. The network environment 100 of FIG. 2 includes two user devices, an administrator device 104-A and a participant device 104-P. The administrator device 104-A may be associated with an administrator of a collaborative service event and the participant device 104-P may be associated with a participant, or prospective participant, of the collaborative service event. The participant may be a specific user, a group of users, or a location (e.g., a meeting room). The administrator may also be referred to as a host of the event in some instances. The collaborative platform server 124 may host, or otherwise make available, the collaborative activity/shared content 204 and may also store a list of participants along with associated attestations 208.

Figure 3:
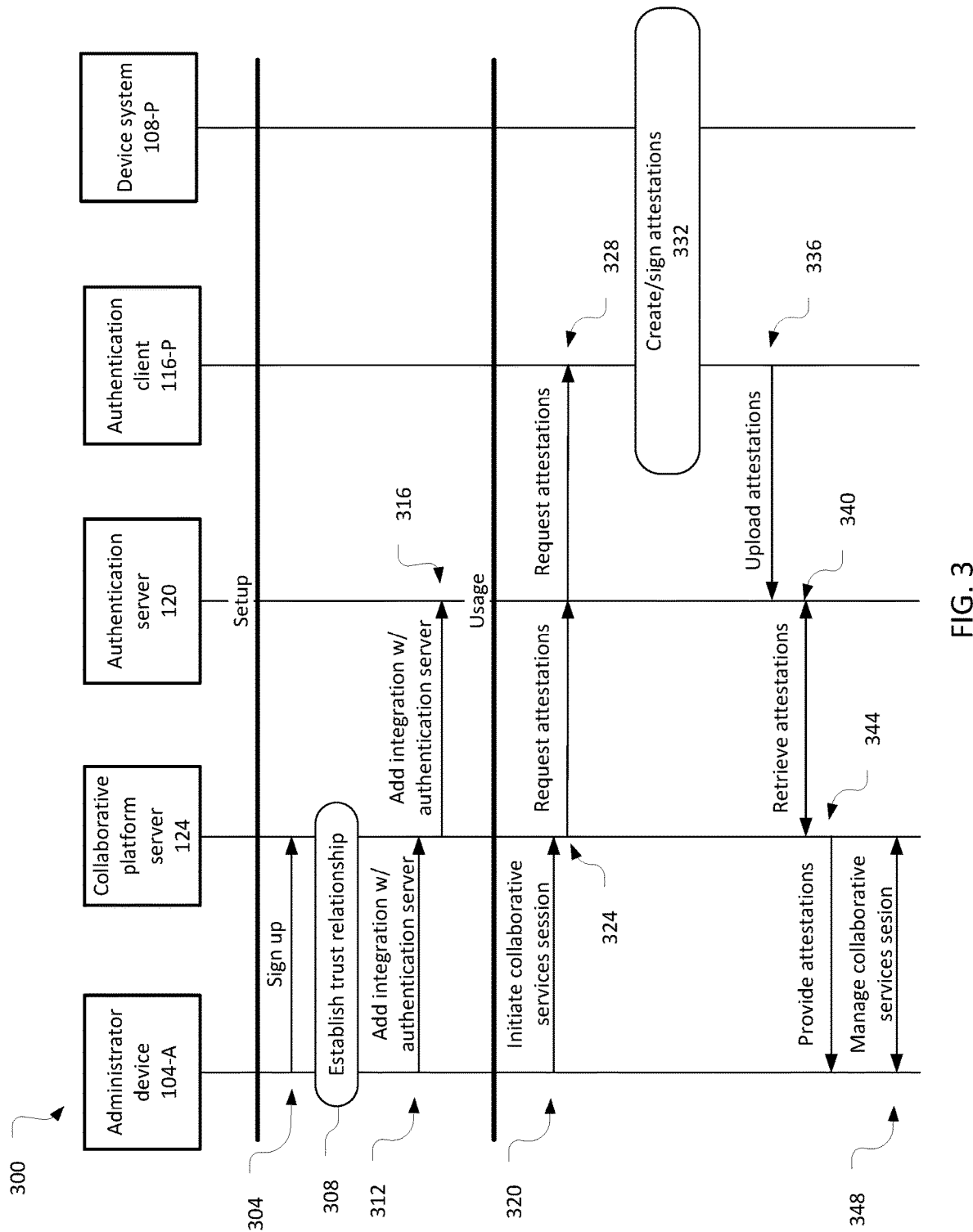
FIG. 3 illustrates a signaling diagram in accordance with some embodiments.

FIG. 3 illustrates a signaling diagram 300 for setup and use of an authenticated collaborative service by components of the network environment 100 in accordance with some embodiments.

The signaling diagram 300 may begin with a setup phase in which the administrator device 104-A sends a sign-up message to the collaborative platform server 124 at 304. The sign-up message may initiate a process of creating an account with the collaborative platform server 124. The account-creation process, which may be specific to the collaborative platform server 124, may establish a trust relationship between the administrator device 104-A and the collaborative platform server 124 at 308.

After creating the account and trust relationship, the administrator device 104-A may, at 312, add an integration with the authentication server 120. At 316, the collaborative platform server 124 may send a message to the authentication server 120 to complete the creation of the integration between the collaborative platform server 124 and the authentication server 120 to support authentication of collaborative services hosted by the administrator device 104-A. In some embodiments, the collaborative platform server 124 may have an API that interfaces with the authentication server 120 to facilitate the integration and subsequent interactions.

After creating the account and integrating with the authentication server 120, the signaling flow may advance to a usage phase in which the administrator device 104-A transmits the message to the collaborative platform server 124 to initiate a collaborative services session. For example, the administrator may initiate a collaborative activity such as a web meeting or create shared content such as a video.

In some embodiments, the collaborative platform server 124 may, on behalf of the administrator device 104-A, prompt various entities to provide cryptographically signed attestations about one or more attributes associated with the entities. The entities may be participants, or prospective participants of a meeting. The entities may be a security principal such as, for example, a user, device, or system. The attested attributes may include, for example, user/device/location identity, device/location/system security, or location features. At 324, the collaborative platform server 124 may send a request for attestations to the authentication client 116-P, which may forward the request to an appropriate authentication client 116-P at 328.

The participant devices may use local authentication clients and device systems to fulfill requirements for requested attestations. For example, the authentication client 116-P may employ the device system 108-P, using an API, for example, to create and cryptographically sign one or more attestations at 332. Any of a variety of authentication protocols or algorithms may be used to create/sign attestations. For example, the user may be requested to provide information along with credentials, biometric input, security card, etc. to verify/authentic a source of information. In some embodiments, the attestations may be based on an OpenID Connect (OIDC) in which a user requests, from the authentication server 120, an authentication challenge. The user may sign the authentication challenge and provide it back to the authentication server 120, which may then provide an authentication token.

In some embodiments, the authentication client 116-P may include a hardware component, referred to as a hardware root of trust, for the creation and signing of attestations. The hardware root of trust may be, for example, a trusted platform module (TPM), a secure enclave, a trusted execution environment, etc. The authentication client 116-P may use APIs of the hardware root of trust to create cryptographic keys and sign attestations with those keys. This may be used to attest to the fact that the attestation's provenance is the hardware root of trust itself. The authentication server 120 may have the ability to verify those claims by verifying the validity of the signatures associated with the attestations.

In some embodiments, the attestations may be an attestation of authentication, identity, etc. In some embodiments, the attestations may also be associated with a level of assurance. The level of assurance may refer to a level of confidence a system can have in the attested attribute. For example, an authentication attestation may include an authenticator assurance level (AAL) 1 (some confidence), AAL 2 (high confidence), or AAL3 (very high confidence). For another example, an identity attestation may include an identity assurance level (IAL) 1 (some confidence), IAL 2 (high confidence), or IAL3 (very high confidence).

Once created, the cryptographically signed attestations, which may be signed by a cryptographic key rooted in a hardware root of trust, may be provided to the authentication client 116-P at 332, which may then be uploaded to the authentication server 120 at 336. In the event one or attestations were requested but were not able to be generated successfully, the authentication client 116-P may provide the authentication server 120 an indication of the failed attestations. As used herein, reference to an attestation may include a successful attestation or a failed attestation.

The signaling diagram 300 may further include, at 340, the collaborative platform server 124 retrieving the attestations from the authentication server 120. This may include a request/response or, alternatively, the authentication server 120 may preemptively send the attestations to the collaborative platform server 124.

The signaling diagram 300 may further include, at 344, the collaborative platform server 124 providing attestations to the administrator device 104-A. An authentication client 116-A at the administrator device 104-A may verify the cryptographic signature of the attestations, which may then be used to manage the collaborative services session at 348. For example, the administrator may, based on the received attestations, choose to grant permissions to the participant for participating in the collaborative services session. The permissions may enable/disable/limit a participant's access to aspects of the collaborative services session or shared content therein.

In some embodiments, verification of the cryptographic signatures of the attestations may be performed by additional/alternative components of the system. For example, the authentication server 120 may receive the cryptographically signed attestations from the authentication client 116-P and verify the cryptographic signatures. The authentication server 120 may then provide a simplified attestation to the collaborative platform server 124 that is based on the verification of the cryptographically signed attestations. This may provide the collaborative platform server 124 with the desired information without requiring the collaborative platform server 124, or a downstream component, to have the capabilities of verifying the cryptographic signatures. This may be enabled through a trust relationship established between the authentication server 120 and the collaborative platform server 124. In other embodiments, additional/alternative components may perform the verification.

While the signaling diagram 300 describes attestations being created in response to the initiation of a collaborative services session, in other embodiments, the creation of the attestations may be separated therefrom. For example, a set of attestations may be obtained from a variety of users and stored in the list of participants with attestations 208 in the collaborative platform server 124. In some embodiments, the list may be additionally/alternatively stored in the authentication server 120. The attestations of the list 208 may be valid for a period of time and could persist across multiple collaborative services sessions. Thus, when a collaborative services session is initiated, the collaborative platform server 124 may obtain attestations, associated with (perspective) participants of that session, from the previously acquired attestations from the list 208. The authentication server 120 may be responsible for maintaining up-to-date attestations and may periodically query the authentication clients 116-P accordingly.

Figure 4:
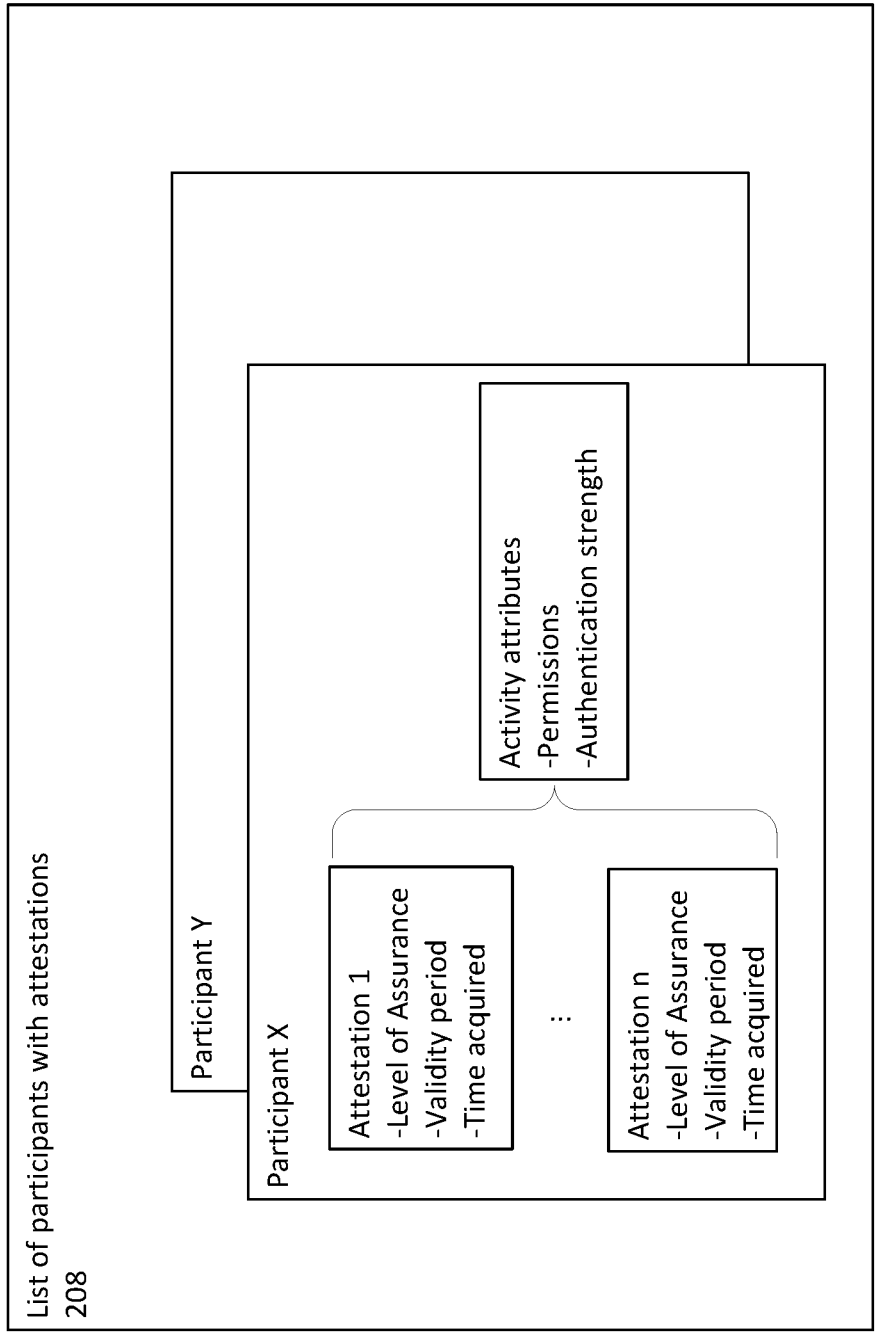
FIG. 4 illustrates a stored list of participants with attestations in accordance with some embodiments.

FIG. 4 illustrates the list of participants with attestations 208 in accordance with some embodiments. For example, each participant may include one or more attestations. Each attestation may include a number of attributes including, for example, a level of assurance of the attestation, a validity period of the attestation, a time the attestation was acquired, or the hardware provenance associated with the key that created the attestation. In some embodiments, each participant may also various activity attributes that are generated based on the attestations. For example, an activity attribute may include a permissions attribute that describes permissions for participating in a collaborative services session (e.g., enable/disable/limit a participant's access to one or more aspects of the collaborative services session or shared content therein). An activity attribute may also include an authentication strength that provides an indication of how strongly the participant has been authenticated. In some embodiments, the authentication strength may be generated based on the number/type of attestations along with the levels of assurance associated with each attestation. In an instance in which the participant only has one attestation, the authentication strength may correspond to, and be synonymous with, the level of assurance.

In some embodiments, the activity attributes may be automatically generated based on a predefined policy. In some embodiments, the policy may account for a sensitivity setting of the collaborative services session. For example, some sessions may require higher levels of authentication for participation than others. The administrator may have the capability of overriding one or more of the automatically generated activity attributes. In other embodiments, the administrator may generate the activity attributes de novo.

While various embodiments describe the participants as specific users, a participant may also be a device/system that may have a location attribute such as, for example, a meeting room. Attestations associated with a device/system at a meeting room may be derived from a meeting originator, an endorsing party, or security or access-control systems at the location (e.g., biometric data, card readers, motion-detector sensors, etc.).

In some embodiments, desired attestations may be specific to a collaborative services session. For example, an administrator may desire a first set of attestations for one type of session and a second set of attestations for another type of session. The administrator device 104-A may establish the attestations desired for a particular session in the account setup phase or the usage phase (e.g., upon initiating the collaborative services session at 320).

Figure 5:
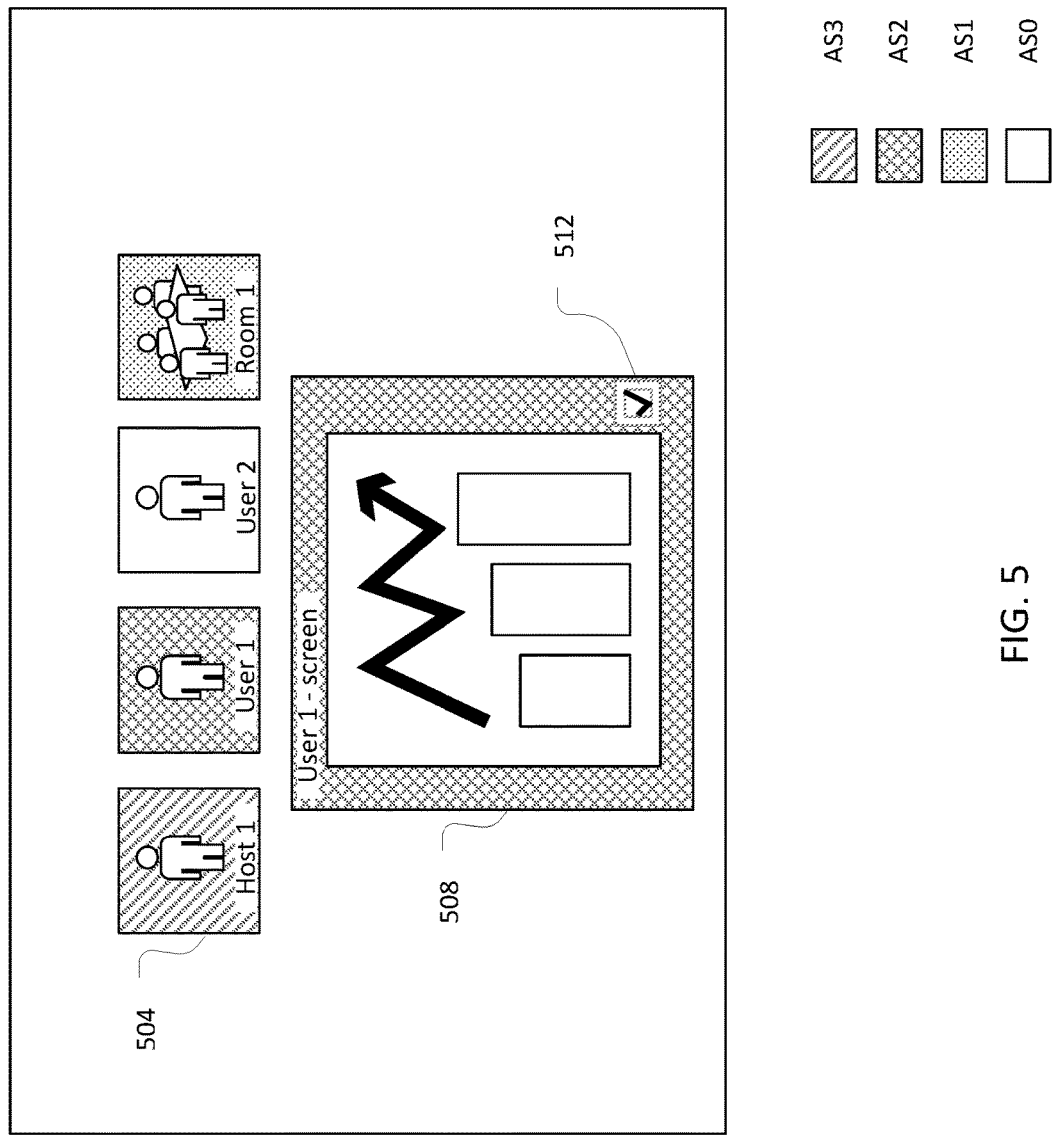
FIG. 5 illustrates a user display in accordance with some embodiments.

In some embodiments, an indication associated with a user's attestations may be provided to one or more participants of a collaborative services session. For example, FIG. 5 illustrates a user display 500 that may be output by a collaborative platform client 112 in accordance with some embodiments. In this example, the collaborative services session is generally shown as a videoconference; however, similar concepts may be applied to other types of services.

In this example, the participants of the videoconference may include Host, User 1, User 2, and Room 1. Attestations for each participant may have been obtained in a manner similar to that discussed above. Based on the attestations, the host may be assigned a highest authentication strength (e.g., AS3), User 1 may be assigned the next highest authentication strength (e.g., AS2), Room 1 may be assigned the next highest authentication strength (e.g., AS1), and User 2 may be assigned a lowest authentication strength (e.g., AS0).

The collaborative platform client 112 may present indications associated with one or more attestations of a participant. For example, the indication may show, or otherwise convey, an authentication strength associated with each of the participants. The indication may be referred to herein as an "AS indication." The AS indications may include a background (e.g., background 504), border 508, or an icon 512 as shown in FIG. 5. In other embodiments, the AS indications may be a watermark or other overlaid feature or a scannable mark. The AS indication may be associated with the participants, as shown in the backgrounds of the participant banner, or to the content contributed by the user, e.g., as shown in the display of User 1's screen.

While the user display 200 shows the AS indications conveying one or more different AS levels, in other embodiments, an AS indications may be binary (for example, either showing presence or absence of a verified attestation). In some embodiments, individual AS indication may be respectively provided for individual participants. In other embodiments, an aggregated AS indication may correspond to more than one participant (e.g., a subset or all of the participants). The aggregated AS indication may be generated based on the individual AS indications. For example, it could be a minimum, maximum, arithmetic, or geometric mean of the individual AS indications. Some embodiments May generate the aggregate AS indication based on the minimum individual AS indications in order to show the potential vulnerability of the group.

Imposing a mandatory display of an authentication strength may allow the participants to confidently identify users/content that may compromised and others that may be trusted.

In some embodiments, the AS indications may provide an indication of whether permissions or authentication strength were provided by the administrator by overriding a predetermined policy. Consider, for example, that the provided attestations for a user are not sufficient to grant the user access to a meeting based on a predetermined policy. If the administrator overrides the policy and admits the user to the meeting, the AS indication may provide an indication that the user has been admitted by an administrative exemption to the policy.

In some embodiments, information associated with the authentication strength may be made available to one or more participants. For example, by selecting the indication, a participant may be able to see the attestation details including, for example, specific attestations, levels of assurances, validity period, time acquired, whether an administrative exemption to a policy was granted, etc. In embodiments in which the AS indication is a scannable mark, e.g., quick-response (QR) code, the AS indication may be scanned with a camera of another user device. An authentication client, similar to authentication client 116, on the scanning device may then display the attestation details for further examination by the user. In the event the AS indication is associated with a video stream, the scannable mark may also enable the user to view a recording of the video stream to inspect historical evidence of the user's authenticity.

In an embodiment in which the collaborative services is a collaborative document, the AS indication may be associated with comments/edits attributed to a user to express a level of authentication that the user had at the time the comment or edit was applied. In instances in which the collaborative platform client/server record user provenance, the authentication server may provide indications of at-the-time authentication strength to facilitate auditing capabilities.

In some embodiments, AS indications, such as a watermark, may be off by default and only affirmatively displayed once proper authentication has been obtained.

In some embodiments, the prominence of the AS indication may be based on the authentication strength associated therewith. For example, AS indications for weakly authenticated users may be the most prominent by, for example, making the indications larger, more visually distinct/colorful, dynamic (e.g., flashing), etc. The AS indications for strongly authenticated users may be less prominent. This may draw focus to the participants/content that has a highest risk of being compromised.

The AS indications may be provided by the collaborative platform to prevent an attacker from presenting a forged AS indication. For example, with respect to FIG. 5, the AS indications may be presented external to the portion of the display that presents the data provided by the users. So, instead of presenting the AS indication in an area of the chart shown on User 1's screen, the AS indication may be placed in the border 508 or otherwise adjacent to the chart in an area that is provided by the collaborative platform.

In some embodiments, an AS indication such as a watermark or other overlaid feature may be set to always-on-top. This may prevent forgery of the AS indication by changing a background or providing some other manipulation of the in-band data. The AS indication may incorporate obfuscation techniques to resist alteration/removal and may additionally/alternatively allow for personalization through additional information to enhance authenticity evaluation, replay resistance, and traceability. The additional information may include, but is not limited to user information, device information, geolocation information, logos, timestamp/time zone information, etc.

In some embodiments, the AS indication may be generated with a temporal coding system to guard against a replay attack. For example, the AS indication may be generated using a one-time password (OTP) that is valid only for one collaborative services session.

In some embodiments, the AS indication may be updated in real-time to reflect changes in user or device security posture or environmental context. For example, if the authentication client 116-P of a participant device 104-P detects a change related to a previously-provided attestation, the authentication client 116-P may push an update through to the collaborative platform. The collaborative platform may then update the activity attributes (with or without administrator input) and the AS indication accordingly.

In some embodiments, the AS indication may be selectively displayed to a subset of the users. This may be based on a predefined policy or based on a configuration provided by the administrator. The subset of users may be selected based on their authentication strength or some other criteria. In some instances, the other criteria may include whether the user is within a company or organization (e.g., an internal user) or outside of the company or organization (e.g., an external user). An external user may be, for example, a contractor, business partner, client, customer, or prospect. While the challenge of understanding the identity of a peer participant exists for both internal and external users, in some instances, it may be beneficial to only show strong claims to some of the participants and show weak claims to all participants. This may allow the participants to focus scrutiny on the users/content associated with relatively weaker authentications.

FIG. 6 is a chart 600 depicting a selective display of AS indications in accordance with some embodiments. In some instances, AS indications above a threshold (e.g., high authentication strength) may be shown to internal users but not external users, while AS indications below the threshold (e.g., low authentication strength) may be shown to both internal and external users.

While chart 600 shows one example with two categories of users/authentication strengths, other examples may include a more granular approach with different types/categories of users and different numbers/types of authentications.

Figure 7:
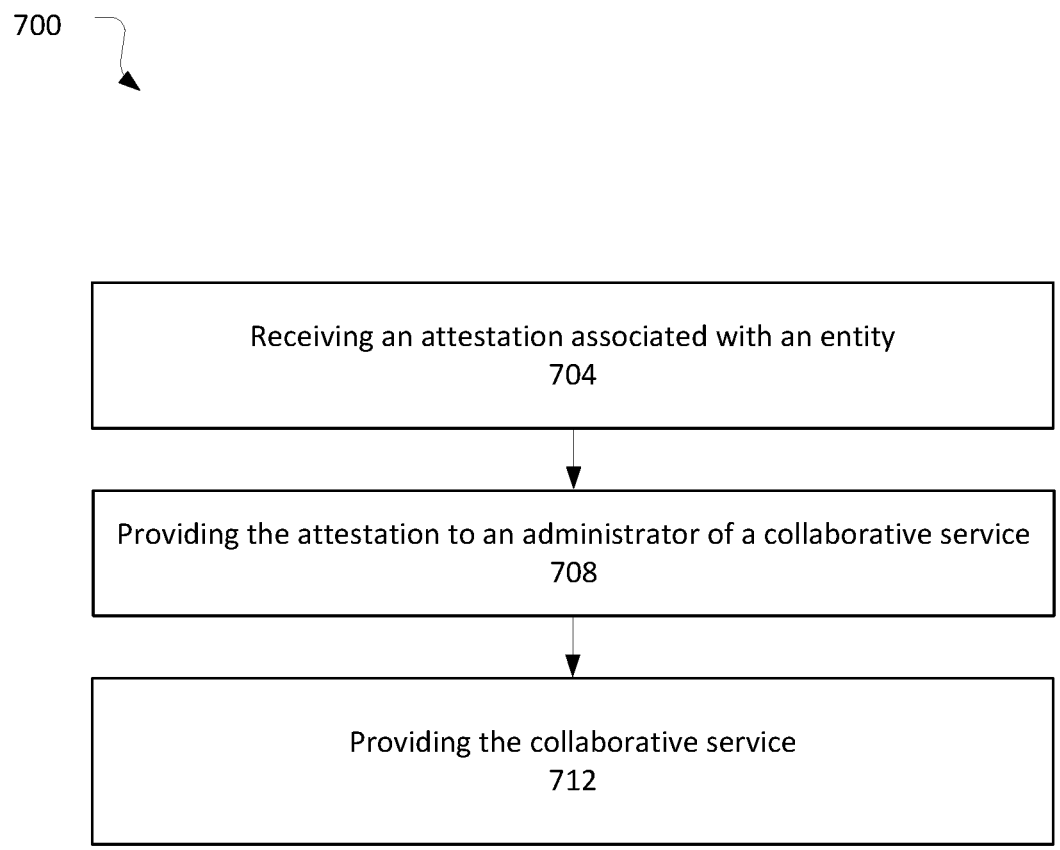
FIG. 7 illustrates an operation flow/algorithmic structure in accordance with some embodiments.

FIG. 7 is an operation flow/algorithmic structure 700 in accordance with some embodiments. The operation flow/algorithmic structure 700 may be performed or implemented by a collaborative platform (e.g., collaborative platform server 124 or collaborative platform client 112), device 1000, device/system 1100, or components therein, for example, processors 1004 or 1116.

The operation flow/algorithmic structure 700 may include, at 704, receiving an attestation associated with an entity for participating in a collaborative service. The attestation may be received from an authentication server. The attestation may attest to an identity of the entity, an authentication of the entity or data received from the entity, a posture of a device associated with the entity, an authorization of the entity to access a specific class of information, or a location of the entity. The entity may be a user, device or system. If the entity is has a location attribute such, e.g., a meeting room, the attestation may attest to an identity of one or more users at the location or to aspects associated with a security system at the location.

In some embodiments, the attestation may be a failed attestation in which either no affirmative attestation was received or some part of the authentication process of an affirmative attestation was not successful. A failed attestation may be associated with a lowest level of authentication strength.

The operation flow/algorithmic structure 700 may further include, at 708, providing the attestation associated with the entity to an administrator of the collaborative service. In some embodiments, in response to providing attestation, the collaborative platform may receive an indication of one or more permissions associated with the entity for participating in the collaborative service. The permissions may be provided by the administrator or a predetermined policy.

In some embodiments, the collaborative platform may choose to take into account the hardware root of trust provenance state of the attestation in order to further its trust in the attestation. This may directly or indirectly affect the permissions granted or the authentication strength associated with the attestation.

The operation flow/algorithmic structure 700 may further include, at 712, providing the collaborative service to a number of participants, including the entity associated with the attestation. The collaborative services may be, for example, a (video/web/tele) conference or a collaborative software application.

In providing the collaborative service, the collaborative platform may present data received from the entity to one or more participants of the collaborative services session. The data may include video data or application data. The collaborative platform may also present an indication of the attestation to one or more participants. The indication of the attestation may be a background, icon, watermark, border, or scannable mark that is associated with the presentation of the data.

In some embodiments, the collaborative platform may present additional information associated with the indication of the attestation. The additional information may include, for example, an indication of: a time of receiving the data from the entity; a time of receiving the attestation from an authorization server; a location of the entity when receiving the data from the entity; the provenance of the attestation in terms of the signing key being rooted in a hardware root of trust; or a location of the entity when a signed attestation is created by an authentication client on a device associated with the entity.

In some embodiments, the attestation may be associated with a level of assurance or an authentication strength. The indication of the attestation may be presented in a manner to indicate the level of assurance or authentication strength.

In some embodiments, the indication of the attestation may be presented independent from the data. For example, the indication of the attestation may be presented in a first portion of the user interface, while the data is presented in a second portion of the user interface. As discussed above, this may prevent the user relying on the data to falsely convey the indication of the attestation.

In some embodiments, the data may be overlaid with the indication of the attestation. In this manner, the indication of the attestation may be presented in an always-on-top manner.

In some embodiments, the indication of the attestation may be generated with a temporal code, e.g., an OTP, to mitigate against replay attacks In some embodiments, the one or more participants to which the indication of the attestation is presented may be selected from a number of participants of the collaborative services session. The participants may be selected based on authentication strengths associated with various participants. For example, an indication of a first participant's attestation may be presented to a second participant if the authentication strength associated with the first participant is greater than (or less than) the authentication strength associated with the second participant or some other threshold.

In some embodiments, the collaborative platform may receive an update associated with the attestation. The update may relate to a change in a security posture of a user or device, or a change in an environmental context. The collaborative platform may then generate an updated attestation based on the update and provide an indication of the updated attestation with the data.

Figure 8:
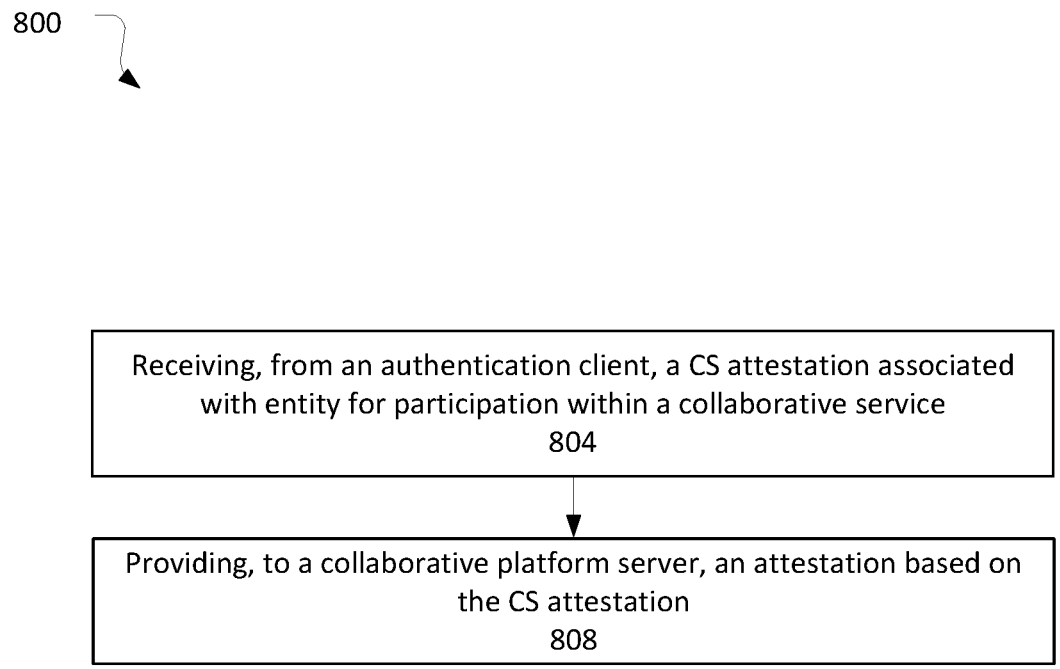
FIG. 8 illustrates another operation flow/algorithmic structure in accordance with some embodiments.

FIG. 8 is an operation flow/algorithmic structure 800 in accordance with some embodiments. The operation flow/algorithmic structure 800 may be performed or implemented by an authentication server 120, device 1000, device/system 1100, or components therein, for example, processors 1004 or 1116.

The operation flow/algorithmic structure 800 may include, at 804, receiving a cryptographically signed (CS) attestation associated with an entity for participation within a collaborative service. The CS attestation may be received from an authentication client hosted on a device associated with the entity.

The CS attestation may attest to an identity of the entity, an authentication of the entity or data provided by the entity for the collaborative service, a posture of a device associated with the entity, an authorization of the entity to access a specific class of information within the collaborative service, or a location of the entity.

In some embodiments, the CS attestation may be created by a hardware root of trust on the authentication client signing in attestation with a first cryptographic key. In these embodiments, the authentication server may create a second cryptographic key that matches or otherwise complements the first cryptographic key. The authentication server may then verify a validity of the CS attestation based on the second cryptographic key.

The operation flow/algorithmic structure 800 may further include, at 808, providing an attestation based on the CS attestation. The attestation may be provided to a collaborative platform (e.g, collaborative platform server). In some embodiments, the attestation provided to the collaborative platform may be the CS attestation itself, or may be derived from the CS attestation.

In some embodiments, the authentication server may receive an update that is related to the previously provided attestation. The update may relate to a change in a security posture of a user or device, or a change in an environmental context. The authentication server may then transmit the update to the collaborative platform.

FIG. 9 is an operation flow/algorithmic structure 900 in accordance with some embodiments. The operation flow/algorithmic structure 900 may be performed or implemented by the authentication client 116, device 1000, device/system 1100, or components therein, for example, processors 1004 or 1116.

The operation flow/algorithmic structure 900 may include, at 904, creating, with a device system, a CS attestation associated with an entity for participation within a collaborative service. The CS attestation may be created in a manner similar to that discussed elsewhere herein.

The CS attestation may attest to an identity of the entity, an authentication of the entity or data provided by the entity for the collaborative service, a posture of a device associated with the entity, an authorization of the entity to access a specific class of information within the collaborative service, or a location of the entity.

The operation flow/algorithmic structure 900 may further include, at 908, providing the CS attestation to an authentication server.

In some embodiments, the authentication client may use the device system to monitor a status of an attestation to detect any changes in a security posture of a user or device, or a change in an environmental context. Based on the monitoring, the authentication client may receive an update that is then transmitted to the authentication server.

Figure 10:
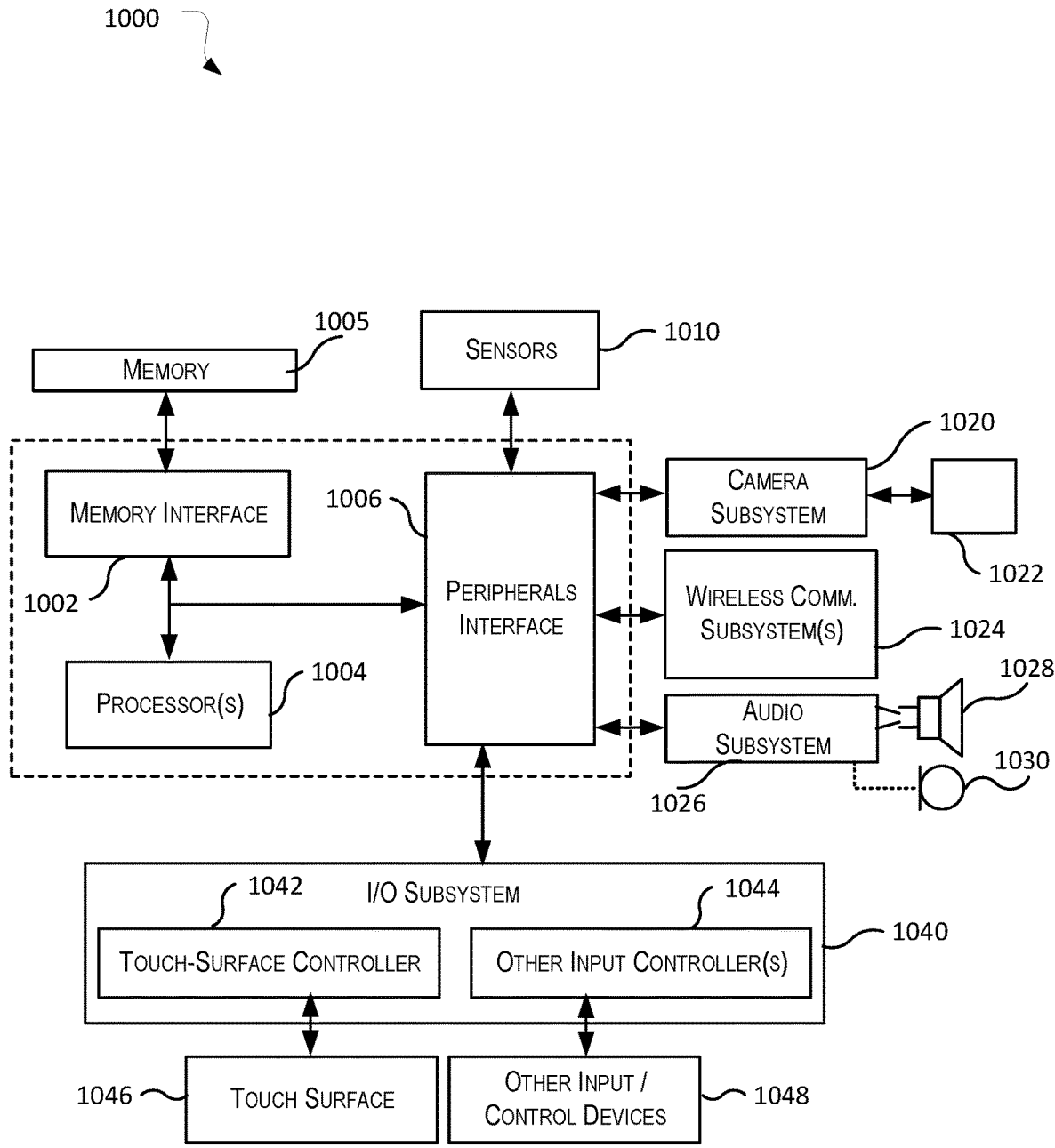
FIG. 10 is a block diagram of an example computing device that can implement the features and processes of FIGS. 1-9 (and/or other approaches described herein) in accordance with some embodiments.

FIG. 10 is a block diagram of an example computing device 1000 that can implement the features and processes of FIGS. 1-9 (and/or other approaches described herein) in accordance with some embodiments. The computing device 1000 can include a memory interface 1002, one or more data processors, image processors and/or central processing units 1004, and a peripherals interface 1006. The memory interface 1002, the one or more processors 1004 and/or the peripherals interface 1006 can be separate components or can be integrated in one or more integrated circuits. The various components in the computing device 1000 can be coupled by one or more communication buses or signal lines.

Sensors, devices, and subsystems can be coupled to the peripherals interface 1006 to facilitate multiple functionalities. For example, sensors 1010 (e.g., a motion sensor, a light sensor, or a proximity sensor) can be coupled to the peripherals interface 1006 to facilitate orientation, lighting, and proximity functions. The sensors 1010 may additionally/alternatively include a global navigation satellite system (GNSS) (e.g., GPS receiver), a temperature sensor, a biometric sensor, magnetometer or other sensing device, to facilitate related functionalities.

A camera subsystem 1020 and an optical sensor 1022 (e.g., a charged coupled device (CCD) or a complementary metal-oxide semiconductor (CMOS) optical sensor) can be utilized to facilitate camera functions, such as recording photographs and video clips, or scanning a QR code. The camera subsystem 1020 and the optical sensor 1022 can be used to collect images of a user to be used during authentication of a user (e.g., by performing facial recognition analysis).

Communication functions can be facilitated through one or more wireless communication subsystems 1024, which can include radio frequency receivers and transmitters and/or optical (e.g., infrared) receivers and transmitters. The specific design and implementation of the communication subsystem 1024 can depend on the communication network(s) over which the computing device 1000 is intended to operate. For example, the computing device 1000 can include communication subsystems 1024 designed to operate over various networks. In particular, the wireless communication subsystems 1024 can include hosting protocols.

An audio subsystem 1026 can be coupled to a speaker 1028 and a microphone 1030 to facilitate voice-enabled functions, such as speaker recognition, voice replication, digital recording, and telephony functions. The audio subsystem 1026 can be configured to facilitate processing voice commands, voice printing and voice authentication, for example.

The I/O subsystem 1040 can include a touch-surface controller 1042 and/or other input controller(s) 1044. The touch-surface controller 1042 can be coupled to a touch surface 1046. The touch surface 1046 and touch-surface controller 1042 can, for example, detect contact and movement or break thereof using any touch sensitivity technologies, including, but not limited to, capacitive, resistive, infrared, and surface acoustic wave technologies, as well as other proximity sensor arrays or other elements for determining one or more points of contact with the touch surface 1046.

The other input controller(s) 1044 can be coupled to other input/control devices 1048, such as one or more buttons, rocker switches, thumbwheel, infrared port, USB port, and/or a pointer device such as a stylus. The one or more buttons (not shown) can include an up/down button for volume control of the speaker 1028 and/or the microphone 1030.

In one implementation, a pressing of the button for a first duration can disengage a lock of the touch surface 1046; and a pressing of the button for a second duration that is longer than the first duration can turn power to the computing device 1000 on or off. Pressing the button for a third duration can activate a voice control, or voice command, module that enables the user to speak commands into the microphone 1030 to cause the device to execute the spoken command. The user can customize a functionality of one or more of the buttons. The touch surface 1046 can, for example, also be used to implement virtual or soft buttons and/or a keyboard.

In some examples, the computing device 1000 can present data including application/video/audio data.

The memory interface 1002 can be coupled to memory 1005. The memory 1005 can include high-speed random-access memory and/or non-volatile memory, such as one or more magnetic disk storage devices, one or more optical storage devices, and/or flash memory (e.g., NAND, NOR). The memory 1005 can store an operating system.

The operating system can include instructions for handling basic system services and for performing hardware dependent tasks. In some examples, the operating system can be a kernel (e.g., UNIX kernel). In some examples, the operating system can include instructions for performing operations described herein.

The memory 1005 can also store communication instructions to facilitate communicating with one or more additional devices, one or more computers and/or one or more servers. The memory 1005 can include graphical user interface instructions to facilitate graphic user interface processing; sensor processing instructions to facilitate sensor-related processing and functions; phone instructions to facilitate phone-related processes and functions; electronic messaging instructions to facilitate electronic-messaging related processes and functions; web browsing instructions to facilitate web browsing-related processes and functions; media processing instructions to facilitate media processing-related processes and functions; GNSS/Navigation instructions to facilitate GNSS and navigation-related processes and instructions; and/or camera instructions to facilitate camera-related processes and functions.

The memory 1005 can store software instructions to facilitate other processes and functions.

The memory 1005 can also store other software instructions. In some examples, the media processing instructions are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. The memory 1005 can include additional instructions or fewer instructions. Furthermore, various functions of the computing device 1000 can be implemented in hardware and/or in software, including in one or more signal processing and/or application specific integrated circuits.

Figure 11:
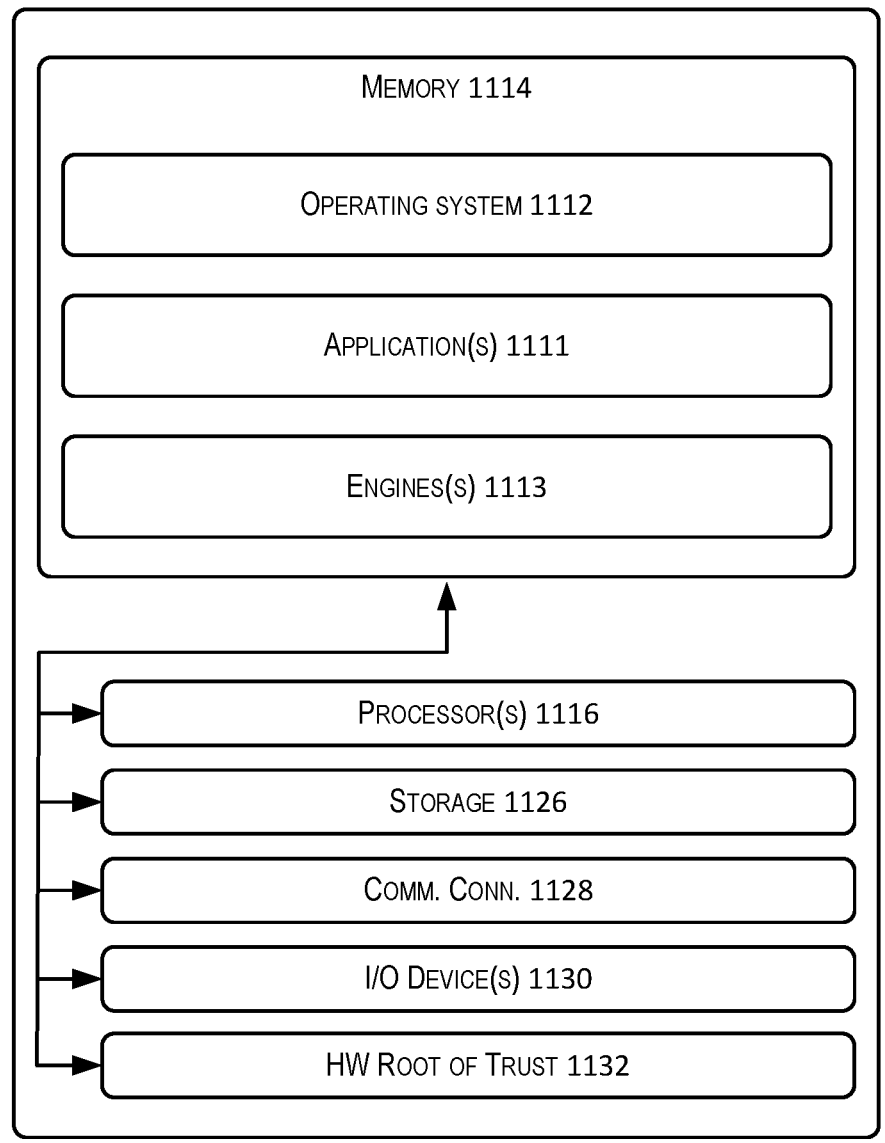
FIG. 11 illustrates an example device/system configured to implement techniques described herein in accordance with some embodiments.

FIG. 11 illustrates a device/system 1100 configured to implement techniques described herein in accordance with some embodiments. In some examples, the device/system 1100 may correspond to user device 104, collaborative platform server 124, or authentication server 120.

The device/system 1100 may be any type of computing device such as, but not limited to, a server, a mobile phone, a smartphone, a personal digital assistant (PDA), a laptop computer, a desktop computer, a thin-client device, a tablet computer, a wearable device such as a smart watch, an electronic device in a moveable vehicle or transport device, or the like. In some examples, the device/system 1110 may be in communication with other devices/systems via a network connection.

In one illustrative configuration, the device/system 1100 may include at least one memory 1114 and one or more processing units (or processor(s)) 1116. The processor(s) 1116 may be implemented as appropriate in hardware, computer-executable instructions, firmware, or combinations thereof. Computer-executable instructions or firmware implementations of the processor(s) 1116 may include computer-executable or machine-executable instructions written in any suitable programming language to perform the various functions described. The device/system 1100 may also include geo-location devices (e.g., a global positioning system (GPS) device or the like) for providing and/or recording geographic location information associated with the user device 1106. In some examples, the processors 1116 may include a GPU and a CPU.

The memory 1114 may store program instructions that are loadable and executable on the processor(s) 1116, as well as data generated during the execution of these programs. Depending on the configuration and type of the user device 1106, the memory 1114 may be volatile (such as random access memory (RAM)) and/or non-volatile (such as read-only memory (ROM), flash memory). The device/system 1100 may also include additional removable storage and/or non-removable storage 1126 including, but not limited to, magnetic storage, optical disks, and/or tape storage. The disk drives and their associated non-transitory computer-readable media may provide non-volatile storage of computer-readable instructions, data structures, program modules, and other data for the computing devices. In some examples, the memory 1114 may include multiple different types of memory, such as static random access memory (SRAM), dynamic random access memory (DRAM), or ROM. While the volatile memory described herein may be referred to as RAM, any volatile memory that would not maintain data stored therein once unplugged from a host and/or power would be appropriate.

The memory 1114 and the additional storage 1126, both removable and non-removable, are all examples of non-transitory computer-readable storage media. For example, non-transitory computer-readable storage media may include volatile or non-volatile, removable or non-removable media implemented in any method or technology for storage of information such as computer-readable instructions, data structures, program modules, or other data. The memory 1114 and the additional storage 1126 are both examples of non-transitory computer-storage media. Additional types of computer-storage media that may be present in the device/system 1100 may include, but are not limited to, phase-change RAM (PRAM), SRAM, DRAM, RAM, ROM, Electrically Erasable Programmable Read-Only Memory (EEPROM), flash memory or other memory technology, compact disc read-only memory (CD-ROM), digital video disc (DVD) or other optical storage, magnetic cassettes, magnetic tape, magnetic disk storage or other magnetic storage devices, or any other medium that can be used to store the desired information and that can be accessed by the user device 1106. Combinations of any of the above should also be included within the scope of non-transitory computer-readable storage media. Alternatively, computer-readable communication media may include computer-readable instructions, program modules, or other data transmitted within a data signal, such as a carrier wave, or other transmission. However, as used herein, computer-readable storage media does not include computer-readable communication media.

The device/system 1100 may also contain communications connection(s) 1128 that allow the device/system 1100 to communicate with a data store, another computing device or server, user terminals, and/or other devices via a network. The device/system 1100 may also include I/O device(s) 1130, such as a keyboard, a mouse, a pen, a voice input device, a touch screen input device, a display, speakers, and a printer.

In some embodiments, the device/system 1100 may also include a hardware (HW) root of trust 1132. The HW root of trust 1132 may be, for example, a TPM, a secure enclave, a trusted execution environment, etc. The HW root of trust 1132 may have APIs that allow an authentication client to access the HW root of trust 1132 to create cryptographic keys and sign attestations with those keys.

Turning to the contents of the memory 1114 in more detail, the memory 1114 may include an operating system 1112 and/or one or more application programs or services for implementing the features disclosed herein such as applications 1111 (e.g., web applications, clients (e.g., collaborative platform client or authentication client), and engines 1113.

For one or more embodiments, at least one of the components set forth in one or more of the preceding figures may be configured to perform one or more operations, techniques, processes, or methods as set forth in the example section below.

EXAMPLES

In the following sections, further exemplary embodiments are provided.

Example 1 includes a method to be performed by a collaboration platform, the method comprising: receiving, from an authentication server, an attestation associated with an entity for participating in a collaborative service; providing, to an administrator of the collaborative service, the attestation associated with the entity; and providing the collaborative service to one or more participants, wherein the one or more participants includes the entity.

Example 2 includes a method of example 1 or some other example herein, further comprising: receiving, from the administrator, an indication of one or more permissions associated with the entity for participating in the collaborative service.

Example 3 includes method of example one or some other example herein, further comprising: receiving data from the entity; and presenting, as part of the collaborative service, the data and an indication of the attestation to at least one participant of the one or more participants.

Example 4 includes a method of example 3 or some other example herein, wherein the indication of the attestation is a background, icon, watermark, a border, or a scannable mark that is associated with presentation of the data.

Example 5 includes a method of example 3 or some other example herein, further comprising: presenting, with the indication of the attestation, an indication of: a time of receiving the data from the entity; a time of receiving the attestation from the authentication server; a location of the entity when receiving the data from the entity; or a location of the entity when a signed attestation is created by an authentication client on a device associated with the entity, wherein the attestation is the signed attestation or is based on the signed attestation.

Example 6 includes a method of example 3 or some other example herein, wherein the attestation is associated with a level of assurance or an authentication strength and the indication of the attestation is to indicate the level of assurance or the authentication strength.

Example 7 includes a method of example 3 or some other example herein, wherein presenting the data and the indication of the attestation comprises: presenting the indication independent from presenting the data.

Example 8 includes the method of example 7 or some other example herein, further comprising: presenting the indication in a first portion of a user interface; and presenting the data in a second portion of the user interface.

Example 9 includes a method of example 7 or some other example herein, wherein presenting the data and the indication comprises: overlaying the indication on the data.

Example 10 includes the method of example 3 or some other example herein, further comprising: generating the indication of the attestation with a temporal code.

Example 11 includes a method of example 3 or some other example herein, further comprising: determining an authentication strength associated with each of the one or more participants; selecting the at least one participant from the one or more participants based respective authentication strengths; and presenting the indication to the one or more participants based on said selecting the one or more participants.

Example 12 includes a method of example 3 or some other example herein, further comprising: receiving an update associated with the attestation; generating an updated attestation based on the update; and presenting an indication of the updated attestation with the data.

Example 13 includes a method of example 3 or some other example herein, further comprising: presenting the indication all times at which the data is presented.

Example 14 includes a method of example 1 or some other example herein, wherein the collaborative service is a videoconference, teleconference, webconference, or a collaborative software application.

Example 15 includes a method of example 1 or some other example herein, wherein the attestation attests to an identity of the entity, an authentication of the entity or data received from the entity, a posture of a device associated with the entity, an authorization of the entity to access a specific class of information, or a location of the entity.

Example 16 includes a method of example 1 or some other example herein, wherein the entity is a user, a device, or a system.

Example 17 includes a method of example 1 or some other example herein, wherein the entity is a device or system having an attribute of a location and the attestation is to attest to an identity of a user at the location or a security system at the location.

Example 18 includes a method of example 1 or some other example herein, wherein the attestation includes one or more attributes comprising: a level of assurance of the attestation, a validity period of the attestation, a time the attestation was acquired, or a hardware provenance associated with a cryptographic key that created the attestation.

Example 19 includes the method of example 1 or some other example herein, further comprising: determining an authentication strength associated with the attestation is below a predetermined threshold; and restricting permitted operations of the user with respect to the collaborative services based on said determining the authentication strength is below the predetermined threshold. In some embodiments, the presenting of the indication may additionally/alternatively be based on determining the authentication strength is below the predetermined threshold.

Example 20 includes a method of operating an authentication platform, the method comprising: receiving, from an authentication client, a cryptographically signed (CS) attestation associated with an entity for participation within a collaborative service; and providing, to a collaborative platform server, an attestation based on the CS attestation.

Example 21 includes the method of example 20 or some other example herein, wherein the CS attestation attests to an identity of the entity, an authentication of the entity or data provided by the entity for the collaborative service, a posture of a device associated with the entity, an authorization of the entity to access a specific class of information within the collaborative service, or a location of the entity.

Example 22 includes the method of example 20 or some other example herein, wherein the attestation is the CS attestation.

Example 23 includes the method of example 20 or some other example herein, wherein the CS attestation is created by a hardware root of trust on the authentication client signing an attestation with a first cryptographic key and the method further comprises: creating a second cryptographic key that matches or complements the first cryptographic key; and verifying a validity of the CS attestation based on the second cryptographic key.

Example 24 includes a method of operating an authentication client, the method comprising: creating, with a device system, a cryptographically signed (CS) attestation associated with an entity for participation within a collaborative service; and providing, to an authentication server, the CS attestation.

Example 25 includes the method of example 24 some other example herein, wherein the CS attestation attests to an identity of the entity, an authentication of the entity or data provided by the entity for the collaborative service, a posture of a device associated with the entity, an authorization of the entity to access a specific class of information within the collaborative service, or a location of the entity.

Example 26 includes the method of example 24 some other example herein, wherein creating the CS attestations comprises: using a hardware root of trust of the authentication client to create a cryptographic key; and signing an attestation with the cryptographic key to create the CS attestation.

Another example may include an apparatus comprising means to perform one or more elements of a method described in or related to any of examples 1-26, or any other method or process described herein.

Another example may include one or more non-transitory computer-readable media comprising instructions to cause an electronic device, upon execution of the instructions by one or more processors of the electronic device, to perform one or more elements of a method described in or related to any of examples 1-26, or any other method or process described herein.

Another example may include an apparatus comprising logic, modules, or circuitry to perform one or more elements of a method described in or related to any of examples 1-26, or any other method or process described herein.

Another example may include a method, technique, or process as described in or related to any of examples 1-26, or portions or parts thereof.

Another example may include an apparatus comprising: one or more processors and one or more computer-readable media comprising instructions that, when executed by the one or more processors, cause the one or more processors to perform the method, techniques, or process as described in or related to any of examples 1-26, or portions thereof.

Another example may include a computer program comprising instructions, wherein execution of the program by a processing element is to cause the processing element to carry out the method, techniques, or process as described in or related to any of examples 1-26, or portions thereof.

Any of the above-described examples may be combined with any other example (or combination of examples), unless explicitly stated otherwise. The foregoing description of one or more implementations provides illustration and description but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method to be performed by a collaboration platform, the method comprising:
receiving, from an authentication server, an attestation associated with an entity for participating in a collaborative service;
providing, to an administrator of the collaborative service, the attestation associated with the entity;
providing the collaborative service to one or more participants, wherein the one or more participants includes the entity;
receiving data from the entity;
presenting, as part of the collaborative service, the data and an indication of the attestation to at least one participant of the one or more participants, wherein the indication of the attestation is a background, icon, watermark, a border, or a scannable mark that is associated with presentation of the data;
determining an authentication strength associated with each of the one or more participants;
selecting the at least one participant from the one or more participants based respective authentication strengths; and
presenting the indication to the one or more participants based on said selecting the one or more participants.

2. The method of claim 1, further comprising:
receiving, from the administrator, an indication of one or more permissions associated with the entity for participating in the collaborative service.

3. The method of claim 1, further comprising:
presenting, with the indication of the attestation, an indication of: a time of receiving the data from the entity; a time of receiving the attestation from the authentication server; a location of the entity when receiving the data from the entity; or a location of the entity when a signed attestation is created by an authentication client on a device associated with the entity, wherein the attestation is the signed attestation or is based on the signed attestation.

4. The method of claim 1, wherein the attestation is associated with a level of assurance or an authentication strength and the indication of the attestation is to indicate the level of assurance or the authentication strength.

5. The method of claim 1, wherein presenting the data and the indication of the attestation comprises:
presenting the indication independent from presenting the data.

6. The method of claim 5, further comprising:
presenting the indication in a first portion of a user interface; and
presenting the data in a second portion of the user interface.

7. The method of claim 5, wherein presenting the data and the indication comprises:
overlaying the indication on the data.

8. The method of claim 1, further comprising:
generating the indication of the attestation with a temporal code.

9. The method of claim 1, further comprising:
receiving an update associated with the attestation;
generating an updated attestation based on the update; and
presenting an indication of the updated attestation with the data.

10. The method of claim 1, further comprising:
presenting the indication all times at which the data is presented.

11. The method of claim 1, wherein the collaborative service is a videoconference, teleconference, web conference, or a collaborative software application.

12. The method of claim 1, wherein the attestation attests to an identity of the entity, an authentication of the entity or data received from the entity, a posture of a device associated with the entity, an authorization of the entity to access a specific class of information, or a location of the entity.

13. The method of claim 1, wherein the entity is a user, a device, or a system.

14. The method of claim 1, wherein the entity is a device or system having an attribute of a location and the attestation is to attest to an identity of a user at the location or a security system at the location.

15. The method of claim 1, wherein the attestation includes one or more attributes comprising:
a level of assurance of the attestation, a validity period of the attestation, a time the attestation was acquired, or a hardware provenance associated with a cryptographic key that created the attestation.

16. The method of claim 1, further comprising:
determining an authentication strength associated with the attestation is below a predetermined threshold; and restricting permitted operations of a user with respect to the collaborative services based on said determining the authentication strength is below the predetermined threshold.

17. The method of claim 16, further comprising:

presenting the indication based on said determining the authentication strength is below the predetermined threshold.

\* \* \* \* \*